(12) United States Patent
Sato

(10) Patent No.: US 10,911,663 B2
(45) Date of Patent: Feb. 2, 2021

(54) ELECTRONIC APPARATUS AND METHOD FOR CONTROLLING THE SAME

(71) Applicant: CANON KABUSHIKI KAISHA, Tokyo (JP)

(72) Inventor: Noriaki Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/156,363

(22) Filed: Oct. 10, 2018

(65) Prior Publication Data

US 2019/0116311 A1    Apr. 18, 2019

(30) Foreign Application Priority Data

Oct. 16, 2017 (JP) ................. 2017-200572

(51) Int. Cl.
*H04N 5/232* (2006.01)
*G06F 3/0488* (2013.01)
*G06K 9/00* (2006.01)

(52) U.S. Cl.
CPC ....... *H04N 5/23219* (2013.01); *G06F 3/0488* (2013.01); *H04N 5/23229* (2013.01); *H04N 5/23296* (2013.01); *H04N 5/232935* (2018.08); *H04N 5/232945* (2018.08); *G06F 2203/04806* (2013.01); *G06K 9/00228* (2013.01)

(58) Field of Classification Search
CPC ........... H04N 5/23219; H04N 5/23296; H04N 5/23229; H04N 5/232945; H04N 5/232935; G06F 3/0488; G06F 2203/04806; G06K 9/00228
See application file for complete search history.

(56) References Cited

U.S. PATENT DOCUMENTS 8,478,347 B2 * 7/2013 Kim .................. H04N 5/23216 455/566
8,934,040 B2 * 1/2015 Okazawa ........... H04N 5/23212 345/178

FOREIGN PATENT DOCUMENTS

JP          2013-70164 A      4/2013

* cited by examiner

*Primary Examiner* — Twyler L Haskins
*Assistant Examiner* — Angel L Garces-Rivera
(74) *Attorney, Agent, or Firm* — Canon U.S.A., Inc. IP Division

(57) ABSTRACT

An electronic apparatus is provided and configured to perform control, in response to a specific touch operation on the area corresponding to an unselected specific subject area detected from an image by a detection unit from the image displayed with a first magnification, to select the specific subject area without selecting an organ area included in the specific subject area, and, in response to the specific touch operation on the area corresponding to an organ area included in the specific subject area out of the image displayed with a second magnification larger than the first magnification, to select the organ area.

20 Claims, 4 Drawing Sheets

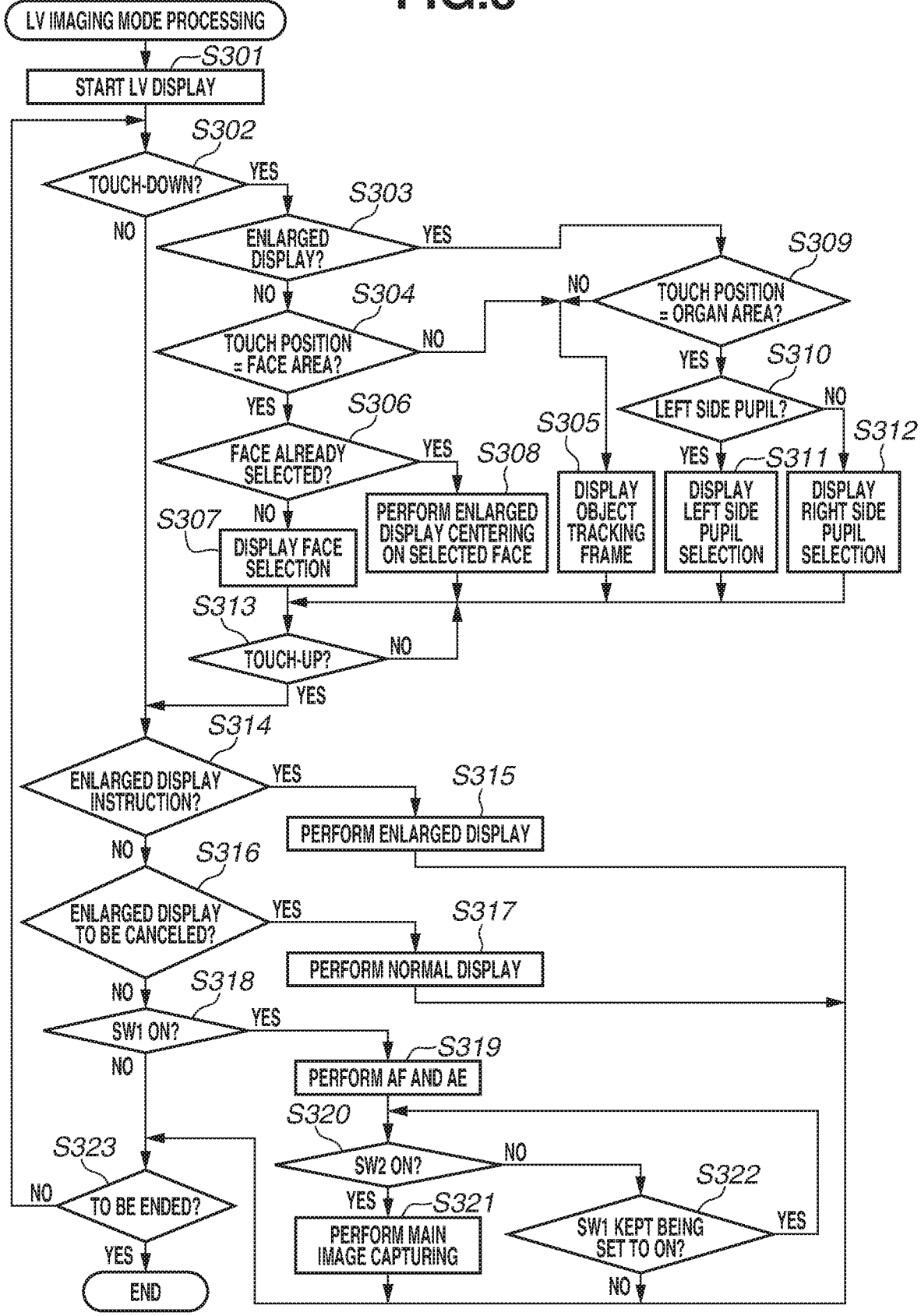

ELECTRONIC APPARATUS AND METHOD FOR CONTROLLING THE SAME

BACKGROUND

Field

The present disclosure relates to an electronic apparatus and a method for controlling the electronic apparatus, and in particular to a selection of an organ area detected from an image.

Description of the Related Art

An imaging apparatus to detect organ areas such as a face and an eye (pupil), and, in response to a user operation, select any one of the detected organ areas as an automatic focusing (AF) target area, is known.

Japanese Patent Application Laid-Open No. 2013-70164 discusses a technique devised in consideration of a case where a detected pupil can be used for AF but is small-sized, and therefore the position of the pupil cannot be correctly specified by touch. In the technique discussed in Japanese Patent Application Laid-Open No. 2013-70164, the value of the sum of the size of the pupil and an offset amount are set as an area where the pupil exists.

Even with the technique discussed in Japanese Patent Application Laid-Open No. 2013-70164, a user may be unable to correctly select a desired pupil (i.e., an organ area). For example, in a case of a small-sized face, even if the offset amount is added to the size of the pupil, the boundary between both pupil areas exists or the two areas overlap at the forehead between both eyes. In this case, when the user makes an attempt to touch either eye on a screen, the user may be unable to correctly touch the target eye on the screen and a position near the forehead may be recognized as a touch position. In such a case, the pupil not intended by the user may be selected.

SUMMARY

The present disclosure is directed to an electronic apparatus capable of allowing a user to more correctly select a desired organ area on a screen.

According to an embodiment, an electronic apparatus, comprising at least one processor or circuit to perform the operations of the following units: a detection unit configured to detect a specific subject area and an organ area included in the specific subject area from an image, a touch detection unit configured to detect a touch operation on a display unit, and a control unit configured to perform control, in response to a specific touch operation on the area corresponding to an unselected specific subject area detected from the image by the detection unit from the image displayed on the display unit with a first magnification, to select the specific subject area without selecting an organ area included in the specific subject area, and in response to the specific touch operation on the area corresponding to an organ area included in the specific subject area from the image displayed on the display unit with a second magnification larger than the first magnification, to select the organ area.

A method for controlling an electronic apparatus, includes detecting a specific subject area and an organ area included in the specific subject area from an image, detecting a touch operation on a display unit, and performing control, in response to a specific touch operation on the area corresponding to an unselected specific subject area detected from the image by the detection unit from the image displayed on the display unit with a first magnification, to select the specific subject area without selecting an organ area included in the specific subject area, and in response to the specific touch operation on the area corresponding to an organ area included in the specific subject area from the image displayed on the display unit with a second magnification larger than the first magnification, to select the organ area.

Further features will become apparent from the following description of exemplary embodiments with reference to the attached drawings.

BRIEF DESCRIPTION OF THE DRAWINGS

FIG. 3 is a flowchart illustrating processing of a live view imaging (LV) mode.

DESCRIPTION OF THE EMBODIMENTS

Exemplary embodiments will be described in detail below with reference to the accompanying drawings.

It is to be noted that the following is merely an exemplary embodiment and can be appropriately modified or changed depending on individual constructions and various conditions of apparatuses in which the embodiments are is applied. Thus, the embodiment is in no way limited to the following exemplary embodiment.

Figure 1A:
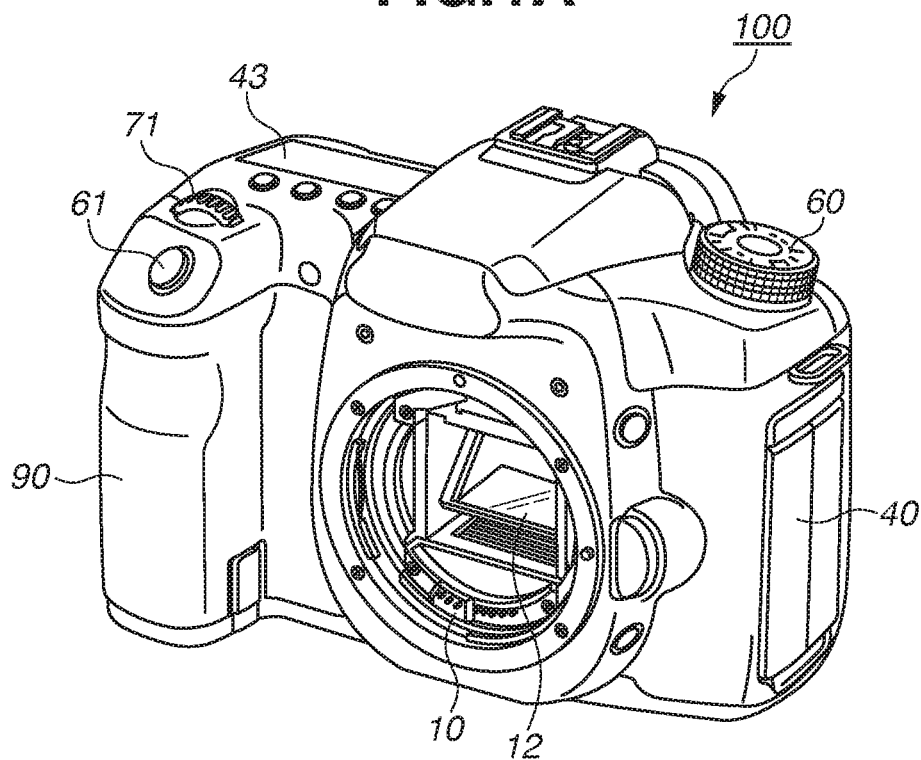
FIGS. 1A and 1B illustrate an outer appearance of a digital camera.
Figure 1B:
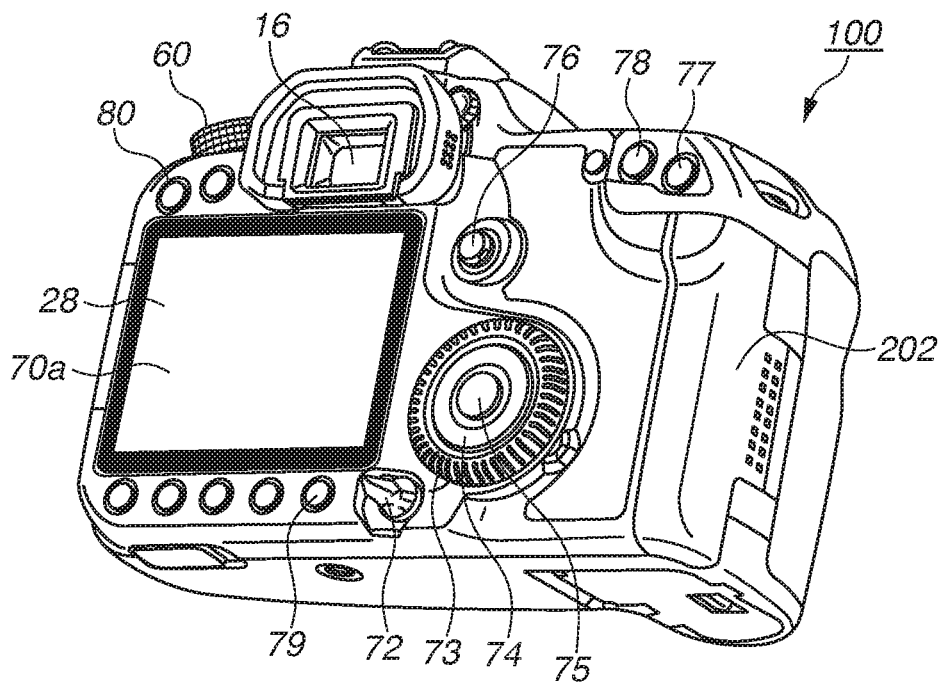

FIGS. 1A and 1B illustrate an outer appearance of a digital camera (imaging apparatus) as an example of an electronic apparatus according to an exemplary embodiment. FIG. 1A is a perspective view illustrating a front panel of a digital camera 10X), and FIG. 1B is a perspective view illustrating a back panel of the digital camera 100. Referring to FIGS. 1A and 1B, a display unit 28 disposed on the rear panel displays an image and various information. An outfinder display unit 43, which is a display unit disposed on the top face, displays the shutter speed, aperture value, and other various setting values of the digital camera 100. A shutter button 61 is an operation portion for issuing an imaging instruction. A mode selection switch 60 is an operation portion for switching between various modes. A terminal cover 40 is a cover for protecting connectors (not illustrated) for connection cables for connecting an external apparatus and the digital camera 100. A main electronic dial 71 is a rotary operation member included in an operation unit 70. Turning the main electronic dial 71 enables changing setting values such as the shutter speed value and aperture value. A power switch 72 is an operation member for turning power of the digital camera 100 ON and OFF. A sub electronic dial 73, which is a rotary operation member included in the operation unit 70, enables moving a selection frame and feeding images. A cross key 74 included in the operation unit 70 is a cross key (four-way key) of which the upper, lower, right, and left portions can be pressed in. An operation corresponding to a pressed portion on the cross key 74 can be performed. A SET button 75, which is a push button included in the operation unit 70, is mainly used to determine a selection item. A live view (LV) button 76 included in the operation unit 70 turns the LV ON and OFF in the still image capturing mode. In the moving image capturing mode, the LV button 76 is used to instruct the digital camera 100 to start and stop moving image capturing (recording). An enlargement button 77, which is an operation button included in the operation unit 70, turns the enlargement mode ON and OFF in the live view display in the imaging mode and changes the magnification in the enlargement mode. In the playback mode, the enlargement button 77 enlarges the playback image to increase the magnification. A reduction button 78 included in the operation unit 70 reduces the magnification of the enlarged playback image to reduce the displayed image. A playback button 79, which is an operation button included in the operation unit 70, switches between the imaging mode and the playback mode. When a user presses the playback button 79 in the imaging mode, the digital camera 100 enters the playback mode allowing the latest image of images recorded in a recording medium 200 to be displayed on the display unit 28. A quick return mirror 12 is moved up and down by an actuator (not illustrated) according to the instruction from the system control unit 50. A communication terminal 10 is a communication terminal of the digital camera 100 to communicate with an interchangeable lens. An eyepiece finder 16 is a look-in type finder for allowing the user to confirm the focus and composition of an optical image of a subject obtained through a lens unit 150 by observing a focusing screen 13. A cover 202 covers a slot storing the recording medium 200. A grip portion 90 is a holding portion having a shape easy to grasp with the right hand when the user holds the digital camera 100.

Figure 2:
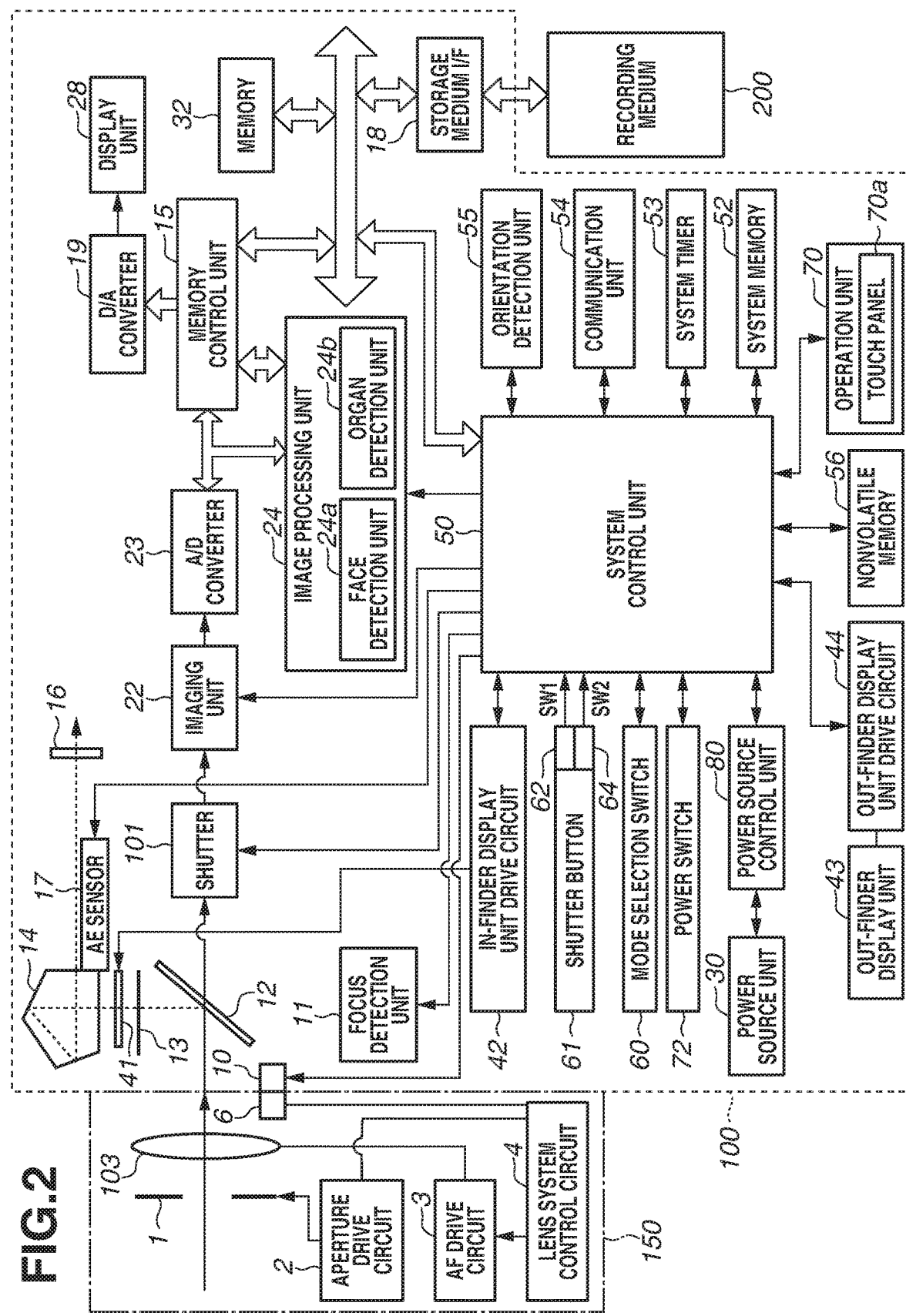
FIG. 2 is a block diagram illustrating a configuration of the digital camera.

FIG. 2 is a block diagram illustrating an example configuration of the digital camera 100 according to the present exemplary embodiment. Referring to FIG. 2, the lens unit 150 is an interchangeable lens unit including an imaging lens 103. Although the lens 103 includes a plurality of lenses, FIG. 2 illustrates only one lens to simplify the drawing. A communication terminal 6 is a communication terminal of the lens unit 150 to communicate with the digital camera 100. The communication terminal 10 is a communication terminal of the digital camera 100 to communicate with the lens unit 150. The lens unit 150 communicates with the system control unit 50 via the communication terminals 6 and 10. In the lens unit 150, a lens system control circuit 4 controls an aperture 1 via an aperture drive circuit 2 and displaces the position of the lens 103 via an automatic focusing (AF) drive circuit 3 to focus on the subject.

An automatic exposure (AE) sensor 17 measures the luminance of the subject through the lens unit 150.

A focus detection unit 11 outputs defocus amount information to the system control unit 50. The system control unit 50 controls the lens unit 150 based on the defocus amount information to perform phase difference AF.

When exposure, live view imaging, and moving image capturing are performed, the quick return mirror 12 (hereinafter referred to as a mirror 12) is moved up and down by an actuator (not illustrated) according to the instruction of the system control unit 50. The mirror 12 switches the destination of the incident light flux incident through the lens 103 between the finder 16 and an imaging unit 22. In the normal state, the mirror 12 is disposed to reflect the light flux to guide it to the finder 16. In the imaging and live view display states, the mirror 12 pops up to guide the light flux to the imaging unit 22 and retreats from the light flux (mirror up). The center portion of the mirror 12 is configured as a half mirror to transmit a part of light so that a part of the light flux is incident onto the focus detection unit 11 for performing focus detection.

By observing the focusing screen 13 via a pentaprism 14 and the finder 16, a photographer can confirm the focus and composition of an optical image of a subject obtained through the lens unit 150.

A shutter 101 is a focal plane shutter capable of freely controlling the exposure time of the imaging unit 22 according to the control of the system control unit 50.

The imaging unit 22 is an image sensor configured of a charge coupled device (CCD) sensor or complementary metal oxide semiconductor (CMOS) sensor for converting an optical image into an electric signal. An analog-to-digital (AD) converter 23 converts an analog signal into a digital signal. The A/D converter 23 is used to convert the analog signal output from the imaging unit 22 into a digital signal.

An image processing unit 24 performs predetermined pixel interpolation, resizing processing such as reduction, and color conversion processing on data from the A/D converter 23 or data from the memory control unit 15. The image processing unit 24 performs predetermined calculation processing by using captured image data. The system control unit 50 performs exposure control and ranging control based on the obtained calculation result. This enables performing the AF processing, AE processing, and Electronic Flash Preliminary Emission processing (hereinafter, referred to as an EF processing) based on the Through-The-Lens (TTL) method. The image processing unit 24 performs predetermined calculation processing using captured image data and also performs TTL-based automatic white balance (AWB) processing based on the obtained calculation result.

Output data from the AD converter 23 is written in the memory 32 via the image processing unit 24 and the memory control unit 15 or directly written in the memory 32 via the memory control unit 15. The memory 32 stores image data captured by the imaging unit 22 and converted into digital data by the A/D converter 23 and stores image data to be displayed on the display unit 28. The memory 32 is provided with a sufficient storage capacity for storing a predetermined number of still images, and moving images and sound for a predetermined time period.

The memory 32 also serves as an image display memory (video memory). A digital-to-analog (D/A) converter 19 converts image display data stored in the memory 32 into an analog signal and supplies the analog signal to the display unit 28. In this way, the image display data written in the memory 32 is displayed by the display unit 28 via the D/A converter 19. The display unit 28 displays an image corresponding to the analog signal from the D/A converter 19 on a display unit such as a liquid crystal display (LCD). The digital signal generated through AD conversion by the AD converter 23 and stored in the memory 32 is then converted into an analog signal by the D/A converter 19. Successively transmitting images to the display unit 28 to display images thereon allows the display unit 28 to function as an electronic view finder capable of live view display.

A frame (AF frame) indicating the focusing point at which AF is currently being performed and icons indicating the setting conditions of the digital camera 100 are displayed on an in-finder LCD unit 41 via an in-finder display unit drive circuit 42.

Various setting values of the digital camera 100 such as a shutter speed value, an aperture value are displayed on the out-finder display unit 43 via an out-finder display unit drive circuit 44.

A nonvolatile memory 56 is an electrically erasable recordable memory such as an electrically erasable programmable read only memory (EEPROM). Constants and programs for operating the system control unit 50 are stored in the nonvolatile memory 56. Programs stored in the nonvolatile memory 56 refer to programs for executing various flowcharts (described below) according to the present exemplary embodiment.

The system control unit 50 is at least one processor or circuit for controlling the entire digital camera 100. Each piece of processing according to the present exemplary embodiment (described below) is implemented when the system control unit 50 executes the above-described programs recorded in the nonvolatile memory 56. A system memory 52 is a random access memory (RAM). Constants and variables for operating the system control unit 50 and programs read from the nonvolatile memory 56 are loaded into the system memory 52. The system control unit 50 also controls the memory 32, the D/A converter 19, and the display unit 28 to perform display control.

A system timer 53 is a time measurement unit for measuring time used for various controls and measuring time for a built-in clock.

The mode selection switch 60, the shutter button 61, the operation unit 70, and the power switch 72 are operation units for inputting various operation instructions to the system control unit 50. The mode selection switch 60 switches the operation mode of the system control unit 50 between the still image recording mode, the moving image capturing mode, and the playback mode. Modes included in the still image recording mode include the auto imaging mode, auto scene determination mode, manual mode, aperture value priority mode (Av mode), and shutter speed priority mode (Tv mode). The digital camera 100 is also provided with various scene modes as imaging settings for each captured scene, the programmed AE mode, and the custom mode. The mode selection switch 60 allows the user to directly select one of these modes. Alternatively, after once selecting an imaging mode list screen using the mode selection switch 60, the user may select either one of a plurality of displayed modes using other operation members. Similarly, a plurality of modes mayx also be included in the moving image capturing mode.

The first shutter switch 62 turns ON in the middle of depression (half-press) of the shutter button 61 provided on the digital camera 100 to generate a first shutter switch signal SW1 (imaging preparation instruction). The first shutter switch signal SW1 causes the system control unit 50 to start operations including the AF processing. AE processing, AWB processing, and EF processing.

A second shutter switch 64 turns ON upon completion of depression (full-press) of the shutter button 61 to generate a second shutter switch signal SW2 (imaging instruction operation). In response to the second shutter switch signal SW2, the system control unit 50 starts a series of imaging operations ranging from signal reading from the imaging unit 22 to image writing (as an image file) in the recording medium 200.

When the user performs an operation for selecting any one of various function icons displayed on the display unit 28, each operation member of the operation unit 70 is suitably assigned a function for each scene and serves as a function button. Examples of function buttons include the end button, return button, image feeding button, jump button, aperture stopping-down button, and attribute change button. For example, when a menu button is pressed, a menu screen allowing various settings is displayed on the display unit 28. The user can intuitively perform various settings by using the menu screen displayed on the display unit 28, the cross key 74 (four-way operation key), and the SET button 75.

The operation unit 70 includes various operation members as input members for receiving operations from the user. The operation unit 70 includes at least the following operation members: the shutter button 61, the main electronic dial 71, the power switch 72, the sub electronic dial 73, the cross key 74, the SET button 75, the LV button 76, the enlargement button 77, the reduction button 78, and the playback button 79.

A power source control unit 80 including a battery detection circuit, a direct-current to direct-current (DC-DC) converter, and a switch circuit for selecting a block to be supplied with power detects the presence or absence of a battery, the battery type, and the remaining battery capacity. The power source control unit 80 also controls the DC-DC converter based on the detection result and an instruction from the system control unit 50 to supply required voltages to the recording medium 200 and other components for required time periods.

A face detection unit 24a is at least one processor or circuit for detecting specific areas such as person's faces from an image obtained by the image processing unit 24. An organ detection unit 24b is at least one processor or circuit for detecting organ areas from an image obtained by the image processing unit 24 and specific areas detected by the face detection unit 24a Organs refer to pupils, nose, mouth, and other facial components. In the present imaging apparatus, both the face detection unit 24a and the organ detection unit 24b (a unit for detecting elements of specific areas detected by the face detection unit 24a) are parts of the image processing units 24. More specifically, the face detection unit 24a and the organ detection unit 24b may be an identical processor, circuit, or module having functions of both units, or may be different processors, circuits, or modules.

A power source unit 30 includes a primary battery such as an alkaline battery and lithium battery, a secondary battery such as a NiCd battery, NiMH battery, and Li battery, and an alternating current (AC) adaptor. A recording medium interface (I/F) 18 is an interface to the recording medium 200 such as a memory card and hard disk. The recording medium 200 is, for example, a memory card for recording captured images, including a semiconductor memory or magnetic disk.

A communication unit 54 wirelessly or wiredly establishes connection to perform transmission and reception of image and audio signals. The communication unit 54 is also connectable with a wireless Local Area Network (LAN) and the Internet. The communication unit 54 can transmit images (including the live view image) captured by the imaging unit 22 and images recorded in the recording medium 200, and can receive image data and other various information from an external apparatus.

An orientation detection unit 55 detects the orientation of the digital camera 100 relative to the gravity direction. Based on the orientation detected by the orientation detection unit 55, the system control unit 50 can determine whether the image captured by the imaging unit 22 is an image captured with the digital camera 100 horizontally held or an image captured with the digital camera 100 vertically held. The system control unit 50 can add direction information corresponding to the orientation detected by the orientation detection unit 55 to the image file of the image captured by the imaging unit 22 or rotate the image before recording. An acceleration sensor or gyroscope sensor can be used as the orientation detection unit 55.

As one of the operation unit 70, the digital camera 100 is provided with the touch panel 70a capable of detecting a touch on the display unit 28. The touch panel 70a and the display unit 28 can be integrally formed. For example, the touch panel 70a is configured in such a manner that the light transmissivity of the touch panel 70a does not disturb the display of the display unit 28 and is attached to the upper layer of the display surface of the display unit 28. Then, the input coordinates on the touch panel 79a are associated with the display coordinates on the display unit 28. This enables configuring such a graphical user interface (GUI) that virtually allows the user to directly operate the screen displayed on the display unit 28. The system control unit 50 can detect the following operations on the touch panel 70a and states thereof.

An operation to start touching the touch panel 70a with the finger or pen that has not been in contact with the touch panel 70a (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to remove the finger or pen in contact with the touch panel 70a from the touch panel 70a to end touching (hereinafter referred to as a "touch-up")

A state where the finger or pen is not in contact with the touch panel 70a (hereinafter referred to as a "touch-off")

When a touch-down is detected, a touch-on is also detected at the same time. After a touch-down, a touch-on is normally kept being detected until a touch-up is detected. A touch-move is detected in a state where a touch-on is detected. Even when a touch-on is detected, a touch-move is not detected if the touch position is not moving. After a touch-up is detected for all of fingers or pen that have been in contact with the touch panel 70a, a touch-off is detected.

The above-described operations and states as well as the position coordinates of the position where the finger or pen contacts the touch panel 70a are notified to the system control unit 50 via an internal bus. Based on the notified information, the system control unit 50 determines what kind of operation (touch operation) has been performed on the touch panel 70a. For a touch-move, the moving direction of the finger or pen moving on the touch panel 70a can be determined for each of the vertical and horizontal components on the touch panel 70a based on changes of the position coordinates. When a touch-move over a predetermined distance or longer is detected, the system control unit 50 determines that a slide operation (drag) has been performed.

An operation to quickly move the finger over a certain distance while in contact with the touch panel 70a and then release the finger therefrom is referred to as a flick. In other words, a flick is an operation to quickly flip the surface of the touch panel 70a with the finger. When a touch-move at a predetermined speed or higher over a predetermined distance or longer is detected and then a touch-up is subsequently detected, it can be determined that a flick has been performed (a flick has been performed following a slide).

A touch operation to simultaneously touch a plurality of positions (e.g., two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch").

The touch panel 70a may be of any one of various types of touch panel including resistance film type, capacitance type, surface elastic wave type, infrared type, electromagnetic induction type, image recognition type, and optical sensor type. Although a touch is detected when the finger or pen comes in contact with the touch panel 70a or when the finger or pen comes close to the touch panel 70a depending on the type, either type is applicable.

The digital camera 100 allows the user to set one of a plurality of AF modes as an AF operation mode at the time of imaging according to a user operation. AF mode setting is performed based on a user operation in an AF mode setting screen displayed when a menu item for AF mode setting is selected in the setting menu screen. A plurality of AF modes is provided for each method for determining an AF target position. According to the present exemplary embodiment, a one-point AF mode or tracking priority mode is set as an AF mode.

The one-point AF mode is an AF mode in which the AF frame indicating a focus adjustment position is set at the center of the imaging range or set to one point specified by the user. In the one-point AF mode, the AF frame does not move even if the subject changes, and AF is performed based on information (the contrast value and the defocus amount for phase difference AF) acquired from the AF frame position regardless of whether the subject such as a face has been detected.

In the tracking priority mode, when tracking is not specified by the user (tracking standby state or tracking release state), the subject determined to be the main subject by the digital camera 100 automatically becomes the AF target (focus adjustment position). When a person's face is detected, the digital camera 100 preferentially determines the detected person's pupil or face as a main subject and sets the main subject as an AF target. When no person's face is detected, the digital camera 100 automatically determines the main subject according to a predetermined condition such as a moving object, a subject having a high contrast value, and a subject near the center and sets the main subject as an AF target. After tracking is specified by the user, the digital camera 100 keeps tracking the subject specified in the LV image and sets the subject currently being tracked as an AF target. For example, when the user specifies tracking a pupil or face of a person A (tracking in progress), the digital camera 100 keeps tracking the pupil or face of the person A even if the person A moves in the LV image and sets the pupil or face as an AF target.

An object other than a person can also be a tracking target (object tracking). The digital camera 100 keeps tracking the same subject under certain conditions (e.g., color of the position with tracking specification, contrast, shape) even if it moves in the LV image, and sets the subject as an AF target. More specifically, the tracking priority mode is an AF mode in which the AF position can be determined through tracking. The AF modes are not limited to the one-point AF mode and the tracking mode. For example, the digital camera 100 may have an AF mode in which tracking is performed in a limited area specified by the user ("zone AF"). The set AF modes are stored in the nonvolatile memory 56 and are loaded into the system memory 52 in the imaging mode processing.

The live view imaging mode in the digital camera 100 according to the present exemplary embodiment, will be described below. When the face detection unit 24a and the organ detection unit 24b detect a face and facial organs such as the right and left eyes, area specification may be possibly performed based only on the touch position at a touch-down or touch-up, i.e., the face area, the left eye area, or the right eye area. A face area refers to an area which is neither the left eye area nor the right eye area out of the face area. However, in this case, the user may be unable to suitably specify an area as intended by the user. In a possible example case, although the user thinks that the user has touched the inside of the right eye area intending to specify the right eye area, the user has actually touched the outside of the right eye area and therefore the entire face or the left eye is specified. This problem is more remarkable in a case where the detected face or organ is small or where the subject's position and size change in the entire image as in the LV or a moving image. Possible causes that the user fails to suitably specify the intended area include the difficulty in confirming whether the intended position is suitably touched because the specification target is hidden by the finger when specifying a small target such as a pupil or face. To solve this problem, according to the present exemplary embodiment, the system control unit 50 enlarges the face (including organ areas) detected upon a touch-down or touch-up and then receives a touch operation for selecting an organ area. This allows the user to select an organ area with a touch operation on the enlarged organ area and therefore more reliably specify the area intended by the user.

FIG. 3 is a flowchart illustrating the LV imaging mode according to the present exemplary embodiment in a case where the digital camera 100 is set in the tracking priority AF mode. This processing is implemented when the system control unit 50 loads a program recorded in the nonvolatile memory 56 into the system memory 52 as a work memory and then executes the program. When the digital camera 100 is activated in the LV imaging mode, the processing illustrated in FIG. 3 is started.

In step S301, the system control unit 50 starts LV image capturing by the imaging unit 22 and starts displaying a captured LV image on the display unit 28. When the system control unit 50 starts LV image capturing, it starts face detection based on the LV image by the face detection unit 24a and starts organ detection by the organ detection unit 24b. In the following description, processing in the LV imaging mode in which the system control unit 50 continuously performs face detection by the face detection unit 24a and organ detection by the organ detection unit 24b, will be described. In the initial state, the LV image is displayed with the normal magnification (first magnification, referred to as non-scaled display) with which the entire LV image fits into the display unit 28 without enlargement.

Figure 4A:
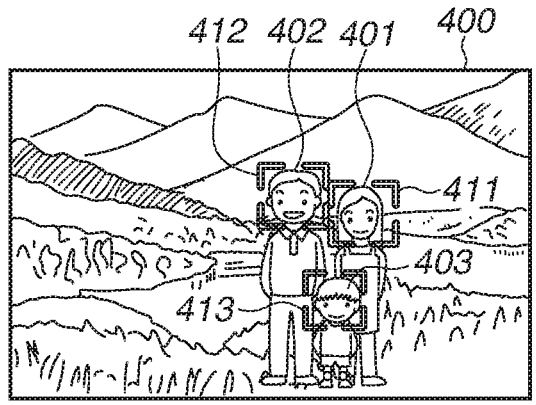
FIGS. 4A to 4E are display examples displayed on a display unit.

FIG. 4A illustrates an example of a LV image directly displayed (non-scaled display) on the display unit 28. A LV image 400 is directly displayed and the entire LV image 400 fits into the LV image display area on the display unit 28. More specifically, the LV image 400 and the LV image display area of the display unit 28 are equal in terms of at least one of the vertical and horizontal sizes, and the LV image 400 is equal to or smaller than the display area in terms of the other size. The face detection unit 24a performs face detection from the LV image 400, as needed. When faces are detected from the LV image 400 by the face detection unit 24a, the system control unit 50 superimposes face frames onto the LV image 400 to display them. A face frame is displayed, as an index (display item), at the position of each face to indicate the area corresponding to each face. In an example illustrated in FIG. 4A, three persons 401, 402, and 403 are captured in the LV image, and the face of each person is detected. Therefore, face frames 411, 412, and 413 are displayed on the LV image 400 in a superimposed manner. FIG. 4A illustrates a state before the user selects a subject (tracking position specification).

In step S302, the system control unit 50 determines whether a touch-down is performed on the touch panel 70a (display surface of the display unit 28). When a touch-down is performed (YES in step S302), the processing proceeds to step S303. On the other hand, when a touch-down is not performed (NO in step S302), the processing proceeds to step S314.

In step S303, the system control unit 50 determines whether the LV image 400 is not directly displayed but displayed in an enlarged manner. When the LV image 400 is currently in the enlargement display state (YES in step S303), the processing proceeds to step S309. On the other hand, when the LV image 400 is in the normal magnification (direct) display state (NO in step S303), the processing proceeds to step S304.

In step S304, the system control unit 50 determines whether the touch position when a touch-down is detected in step S302 (touch-down position) exists in the area corresponding to the face detected by the face detection unit 24a. When the touch-down position exists in the area corresponding to the detected face (YES in step S304), the processing proceeds to step S306. On the other hand, when a face is not detected or when the touch-down position exists outside the area corresponding to the detected face (NO in step S304), the processing proceeds to step S305.

In step S305, the system control unit 50 sets the subject at the touch-down position (subject other than a face or other than facial organs) as a tracking target of object tracking. When the subject is set as a tracking target of object tracking, the system control unit 50 displays a tracking frame (AF frame) on the LV image 400 in a superimposed manner and performs tracking (object tracking) based on the color and luminance information of the tracking target.

Figure 4C:
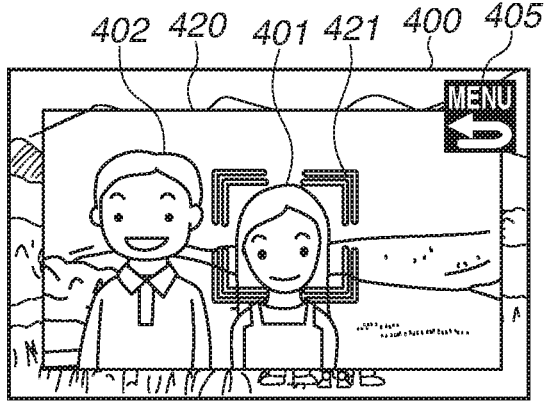

In step S306, the system control unit 50 determines whether the face detected at the touch-down position has already been selected (i.e., currently being tracked). When the face detected at the touch-down position has already been selected (YES in step S306), the processing proceeds to step S308. On the other hand, when the face detected at the touch-down position has not been selected (NO in step S306), the processing proceeds to step S307. Also, with a facial organ area selected (currently being tracked), when a touch-down is performed on the area corresponding to the face including the organ area, the system control unit 50 determines a touch-down on a selected face. Then, the processing proceeds to step S308. For example, in a case where the right side pupil of the person 401 is selected as a tracking target, i.e., in the display state as illustrated in FIG. 4E, when a touch-down is performed on the inside of the face frame 411 (YES in step S306), the processing proceeds to step S308.

In step S307, the system control unit 50 selects the face detected at the touch-down position as a tracking target and starts the tracking processing. Then, the system control unit 50 displays a tracking frame (AF frame) on the LV image 400 in a superimposed manner. More specifically, the system control unit 50 displays the tracking frame on the selected face (face currently being tracked) as an index (display item) indicating that the face is currently being selected (tracked).

Figure 4B:
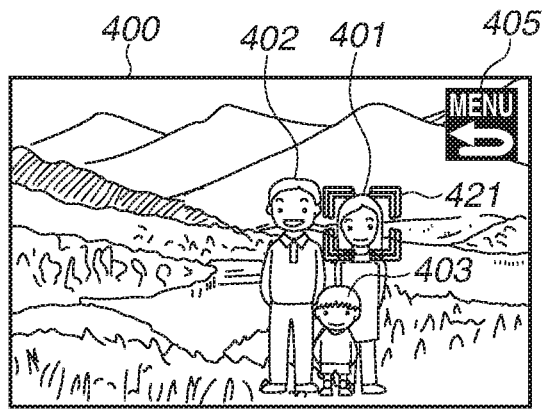

FIG. 4B illustrates an example display displayed on the display unit 28 in step S307. A tracking frame 421 indicating that the face of the person 401 is selected is displayed on the LV image 400 in a superimposed manner. This case is an example display when a touch-down inside the face frame 411 is detected in the display state illustrated in FIG. 4A.

Other face frames 412 and 413 that have been detected are not displayed to prevent confusion with a tracking frame. The double-frame tracking frame 421 is displayed in a display form different from that of the singe-frame face frame 411 in a distinguishable manner. Even if the position of the face of the person 401 changes, the tracking frame 421 is displayed to track the position of the face of the person 401. An icon 405 is a touch icon for receiving an instruction for canceling the tracking (canceling the selected state of the face). When a touch-down on the icon 405 is detected in the display state illustrated in FIG. 4B, the system control unit 50 cancels (stops) the face tracking and resumes the display state illustrated in FIG. 4A.

In step S308, the system control unit 50 controls the display unit 28 to perform an enlargement display of the enlargement range centering on the position of the selected face, determined based on the selected face from the LV image 400. This enlargement display is performed with a second magnification larger than the first magnification (non-scaled display). The system control unit 50 also starts the timer for measuring a predetermined time period for canceling the enlargement display. This timer is used to cancel the enlargement display and resume the normal magnification display when a non-operating state continues for the predetermined time period (about 3 seconds) since the enlargement display is started.

FIG. 4C illustrates an example display in step S308. FIG. 4C illustrates an example of an enlargement display performed when a touch-down is performed inside the tracking frame 421 in the display state illustrated in FIG. 4B. An enlarged LV image 420 is a partial range of the LV image 400 enlarged with the second magnification (larger than the first magnification) and superimposed onto the LV image 40). The present exemplary embodiment will be described below centering on an example where the enlarged LV image 420 is superimposed onto a part of the LV image 400 so that the peripheral portion of the normally displayed LV image 400 can be viewed. However, it is not limited thereto. Instead of the directly displayed LV image 400, the enlarged LV image 420 may be displayed to fit into the entire LV image display area of the display unit 28. The enlarged LV image 420 is displayed so that the center of the selected face immediately before the enlargement display matches the center of the enlargement range. Therefore, in the example illustrated in FIG. 4C, the center of the face of the person 401 is also the center of the enlargement range. According to the present exemplary embodiment, the enlargement range remains unchanged even if the face of the person 401 moves from the center of the screen by the subsequent camera framing or the movement of the person 401. However, it is not limited thereto. More specifically, the enlargement range may be dynamically changed so that the center of the enlargement range constantly matches the center of the face of the person 401 being tracked even if the position of the face of the person 401 in the imaging range changes by the camera framing or the movement of the person 401 after the enlargement display is started. When the enlargement display is performed as illustrated in FIG. 4C, facial organs (eyes, nose, mouth, etc.) of the person 401 are more largely displayed than in the display state before the enlargement (FIG. 4B), making it easier for the user to specify a facial organ of the person 401 by touch.

In step S309, the system control unit 50 determines whether the touch position exists in the organ area detected by the organ detection unit 24b. The processing proceeds to step S309 since the system control unit 50 determines that the enlargement display is currently performed in step S303.

Therefore, in step S309, facial organs (eyes, nose, mouth, etc.) are enlarged as described above, making it easier for the user to specify a facial organ of the person 401 by touch. According to the present exemplary embodiment, the organ which can be specified by the user is the left eye or the right eye. Therefore, when the system control unit 50 determines that the touch-down position exists in the area of the left eye or the right eye detected by the organ detection unit 24b in the enlarged LV image 420 (YES in step S309), the processing proceeds to step S310. On the other hand, when the system control unit 50 determines that the touch-down position does not exist in the area of the left eye or the right eye (NO in step S309), the processing proceeds to step S305. Although, in the present exemplary embodiment, the left eye or the right eye are selectable, the processing is not limited thereto. The mouth, nose, eyebrows, and other organs may be selectable.

In step S310, the system control unit 50 determines whether the touch-down position exists in the area corresponding to the left side pupil displayed on the enlarged LV image 420 out of both eyes of the person 401. When the touch-down position exists in the area corresponding to the left side pupil (YES in step S310), the processing proceeds to step S311. On the other hand, the touch-down position exists in the area corresponding to the right side pupil, (NO in step S310), the processing proceeds to step S312.

In step S311, the system control unit 50 selects the left side pupil of the tracking target face out of the enlarged LV image 420 and starts the tracking processing by setting the left side pupil as a new tracking target. At the position of the left side eye, the system control unit 50 also displays a tracking frame (AF frame) indicating that the left side eye is currently selected as a tracking target. The vicinity of the face of the person 401 is displayed in the format of the face frame 411 which is different from the format of the tracking frame. In step S311, the face frame 411 is not necessarily displayed.

In step S312, the system control unit 50 selects the right side pupil of the tracking target face in the enlarged LV image 420 and starts the tracking processing by setting the right side pupil as a new tracking target. At the position of the right side eye, the system control unit 50 also displays a tracking frame (AF frame) indicating that the right side eye is currently selected as a tracking target. The vicinity of the face of the person 401 is displayed in the format of the face frame 411 which is different from the format of the tracking frame. In step S312, the face frame 411 is not necessarily displayed.

When a new tracking frame is set in response to a user's operation in a state where the enlarged LV image 420 is displayed in steps S311 and S312, the system control unit 50 resets and restarts the timer for measuring the predetermined time period for canceling the enlargement display. More specifically, when a touch operation is performed on the enlarged LV image 420 before the enlargement display is canceled, the system control unit 50 extends the time period for canceling the enlargement display.

Figure 4D:
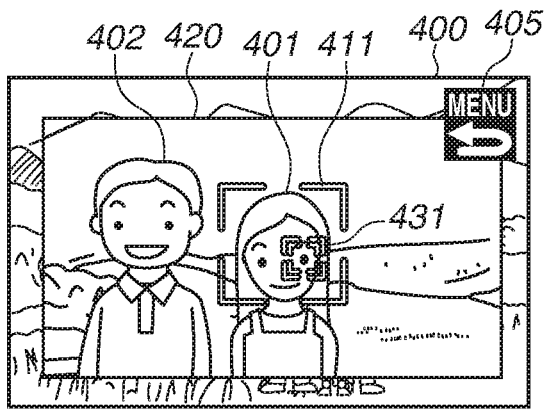
Figure 4E:
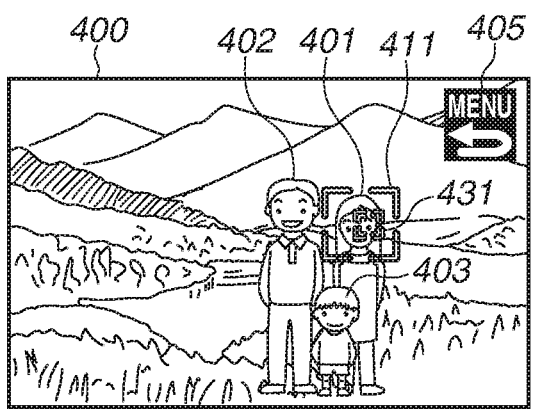

FIG. 4D illustrates an example display on the display unit 28 in step S312. FIG. 4D illustrates an example display performed when a touch-down is performed in the vicinity of the right side pupil of the person 401 in the display state illustrated in FIG. 4C. The vicinity of the right side pupil of the person 401 is a touch reaction area for selecting the right side pupil set based on the position of the right side pupil of the person detected by the organ detection unit 24b. At the position of the right side pupil of the person 401, a tracking frame 431 (AF frame used for AF target in subsequent AF)

is displayed, indicating that that the right side pupil is selected and set as a tracking target. The frame around the face of the person 401 having been displayed in the format of a tracking frame illustrated in FIG. 4C changes to a different display format to become the face frame 411. This allows the user to recognize that the tracking target has changed from the entire face to the right pupil.

In step S313, the system control unit 50 determines whether a touch-up is performed. When a touch-up is performed (YES in step S313), the processing proceeds to step S314. On the other hand, when a touch-up is not performed (NO in step S313), the system control unit 50 waits for a touch-up.

In step S314, the system control unit 50 determines whether an enlargement button 77 is pressed (whether any operation for enlargement display instruction is performed) not in the enlargement display state (in the normal magnification display state). When the enlargement button 77 is pressed (when an enlargement operation is received) in the normal magnification display state (YES in step S314), the processing proceeds to step S315. On the other hand, when the enlargement button 77 is not pressed or when the enlargement display has already been performed (NO in step S314), the processing proceeds to step S316.

In step S315, the system control unit 50 performs the enlargement display in an enlargement mode. The enlargement mode is used by the user to confirm the focusing condition and the like in detail. In the enlargement mode, the LV image can be displayed on the display unit 28 with a magnification of ×5, ×10, or ×1 (direct). After pressing the enlargement button 77 to set the enlargement mode to ON, the user operates a main electronic dial 71 to change the magnification to ×5, ×10, or ×1. When the user presses the enlargement button 77 once again, the enlargement mode turns OFF and the normal magnification display is performed. When the enlargement display is performed by pressing the enlargement button 77, the system control unit 50 does not automatically resume the normal magnification display after a predetermined time has passed. Therefore, the timer does not measure the time period for canceling the enlargement display. Also, when the enlargement display is performed in the enlargement mode, the user can select (specify) an organ area as a tracking target by performing a touch-down.

In step S316, the system control unit 50 determines whether an enlargement cancel event has occurred in the enlargement display state. The enlargement display state includes both the enlargement display state of the LV image by touch on the area of the selected face in step S308 and the enlargement display state of the LV image in the enlargement mode in step S315. In the former enlargement display state, when the timer for measuring the predetermined time period for canceling the enlargement display has expired (i.e., when the predetermined time period has elapsed with no operation performed on the enlarged LV image 420) or when the enlargement button 77 is pressed (an enlargement cancel operation is performed), the system control unit 50 determines that an enlargement cancel event has occurred (YES in step S316), and then, the processing proceeds to step S317. In the latter enlargement display state, when the enlargement button 77 is pressed (an enlargement cancel operation is performed), the system control unit 50 determines that an enlargement cancel event has occurred (YES in step S316), and then, the processing proceeds to step S317. On the other hand, when not in the enlargement display state (NO in step S316), the processing proceeds to step S318.

In step S317, the system control unit 50 cancels the enlargement display and makes a transition to the LV image display state with the normal magnification. In this case, when a tracking target is not specified, the system control unit 50 resumes the display state illustrated in FIG. 4A. When a tracking target is not an organ area but a face, the system control unit 50 resumes the display state illustrated in FIG. 4B. When a facial organ area is selected (specified) as a tracking target in the enlargement display state, the system control unit 50 resumes the display state illustrated in FIG. 4E. Referring to FIG. 4E, the face frame 411 and the tracking frame 431 are superimposed onto the LV image 400 and are displayed. More specifically, the face frame 411 is displayed around the face area of the person 401, and the tracking frame 431 (AF frame) is displayed around the right pupil area. This allows the user to recognize that the tracking target is the right pupil of the person 401.

In step S318, the system control unit 50 determines whether the shutter button 61 is half-pressed and SW1 is set to ON. When SW1 is set to ON (when an imaging preparation instruction operation is performed) (YES in step S318), the processing proceeds to step S319. On the other hand, when SW1 is not set to ON (NO in step S318), the processing proceeds to step S323.

In step S319, the system control unit 50 performs the AF processing and AE processing at the position of the current tracking frame (AF frame) for the tracking target set in the processing in step S305, S307, S311, or S312. The system control unit 50 may also perform the AWB processing. The system control unit 50 may perform at least one of the AF processing, AE processing, and AWB processing not only when SW1 is set to ON but also when an AF frame is set in step S305, S307, S311, or S312. When the user selects a pupil in steps S311 and S312, the system control unit 50 performs AF so that the area of the selected pupil is focused. When the entire face (not other organs) is selected in step S307, the system control unit 50 performs AF so that the right or left pupil automatically selected is focused or the forehead is focused. The system control unit 50 performs the automatic pupil selection, for example, in the following way. When only one pupil is detected, the system control unit 50 selects the detected pupil. When both eyes are detected, the system control unit 50 selects the eye closer to the digital camera 100 or the eye more largely captured.

In step S320, the system control unit 50 determines whether the shutter button 61 is fully pressed and SW2 is set to ON. When SW2 is set to ON (when an imaging instruction operation is performed) (YES in step S320), the processing proceeds to step S321. On the other hand, when SW2 is not set to ON (NO in step S320), the processing proceeds to step S322.

In step S321, the system control unit 50 performs main image capturing including a series of processing ranging from main exposure and signal reading via the imaging unit 22 to captured image writing (as an image file) in the recording medium 200.

In step S322, the system control unit 50 determines whether SW1 is kept being set to ON (a half-press of the shutter button 61 is maintained). When the half-press is maintained (YES in step S322), the processing proceeds to step S320. On the other hand, when the half-press is not maintained (when the depression state of the shutter button 61 is canceled) (NO in step S322), the processing proceeds to step S323.

In step S323, the system control unit 50 determines whether an end event for ending the LV imaging mode is received. Examples of end events include a power off operation, a power off event due to the insufficient remaining battery capacity, and a transition to other operation modes such as the optical finder imaging mode and playback mode. When no end event is received (NO in step S323), the processing returns to step S302. On the other hand, when an end event is received (YES in step S323), the system control unit 50 ends the LV imaging mode processing.

According to the above-described processing, in step S307, when the user wants to select a pupil as an organ area of a face (specific subject area), the user first selects the face. In step S308, when the user touches the area of the selected face, the system control unit 50 displays the selected face portion including the organ area in an enlarged way. This allows the user to select a desired organ area by a touch from the enlarged image of the face. In this way, the user can correctly and easily select a desired organ area. If the user touches the area of an unselected face when the LV image 400 is displayed with the normal magnification, the face is selected and no organ area is selected. Therefore, when the user touches a face intending to select it, the user can reliably and easily select the face without unintentionally selecting facial organ areas (eyes, nose, and mouth).

Although, in the above-described exemplary embodiment, a face and an organ of a subject are selected based on the touch-down position, a face and an organ may be selected based on the touch-up position (touch position where the last touch-up is performed). In this case, in step S302, the system control unit 50 determines whether a touch-up is performed. In steps S304 to S312, the system control unit 50 performs the processing based on the touch-up position instead of the touch-down position. In this case, the processing in step S313 is no longer necessary.

In the above-described exemplary embodiment, the system control unit 50 cancels the display state of the enlarged LV image 420 and resumes the normal magnification LV display in two cases. In one case, a non-operating state continues for a predetermined time period since the enlarged LV image 420 is displayed. In the other case, an enlargement cancel operation is performed by the user. However, it is not limited thereto. The system control unit 50 may cancel the enlargement display when the shutter button 61 is half-pressed (SW1 is set to ON, and an imaging preparation instruction and AF execution instruction operation is performed). In addition, when a new tracking frame is set in response to a user's operation in the display state of the enlarged LV image 420 in steps S311 and S312, the system control unit 50 may immediately cancel the enlargement display without waiting for a predetermined time passage or cancel the enlargement display after waiting for a short time passage of about 0.5 second (second time period). This is because, when the user has selected an organ area in the display state of the enlarged LV image 420, i.e., when the user completes operations which need to be performed with the enlarged LV image 420 displayed, it becomes no longer necessary to display the enlarged LV image 420. When canceling the enlargement display immediately after a new tracking frame is set in the display state of the enlarged LV image 420, the system control unit 50 changes the display state illustrated in FIG. 4C to the display state illustrated in FIG. 4E without performing the display illustrated in FIG. 4D. When canceling the enlargement display after waiting for a short time passage since a new tracking frame is set in the display state of the enlarged LV image 420, the system control unit 50 maintains the display state illustrated in FIG. 4C for the second time period and then automatically changes the display state illustrated in FIG. 4C to the display state illustrated in FIG. 4E.

Although the exemplary embodiment has been described above centering on an operation for selecting an AF or tracking target pupil at the time of live view imaging, it is not limited thereto. The exemplary embodiment is also applicable as an operation for selecting facial organs detected from an image. An image is not limited to a LV image and may be a playback image. For example, the above-described exemplary embodiment is also applicable to a case where a face or facial organs (including eyes) are selected from an image recorded in a recording medium and then image processing is performed on the selected face or organs. For example, in a tablet personal computer (PC), smart phone, seal printing system, it is possible to detect a face, eyes, mouth, and nose from a recorded image, select a desired eye, and apply red-eye correction, mosaic or mask, or pupil emphasis processing (e.g., enlargement) to the desired eye. It is also possible to select the nose and apply image processing such as enlargement emphasis and skin-beautifying effect to the nose. It is also possible to select the mouth and apply image processing such as redness emphasis and glossing to the mouth. As a method for selecting a facial organ in this case, the processing in steps S302 to S313 illustrated in FIG. 3 may be applied to a recorded image instead of the LV image. More specifically, there can be provided an operation method of receiving a selection of a face detected by a touch-down, enlarging the image centering on the face through a touch-down operation on the area of the selected face, and then receiving a touch operation for selecting an organ area included in the face.

Although, in the above-described exemplary embodiment, a face is a specific subject area selectable in the normal magnification display state, other areas such as the upper body area or the entire body area of a person may be selectable in the normal magnification display state as long as these areas include an organ area. In this case, when a touch operation is performed on the upper body area or the entire body area of a selected person, an area including the upper body area or the entire body area is displayed in an enlarged manner, making it easier to select an organ area.

The above-described various controls described to be performed by the system control unit 50 may be performed by one hardware component, or the entire apparatus may be controlled by a plurality of hardware components (e.g., a plurality of processors and circuits) which share processing.

Although, the above-described exemplary embodiment is applied to the digital camera 100, it is not limited thereto. Embodiments are also applicable to an electronic apparatus capable of selecting facial organs detected from an image. More specifically, embodiments may be applicable to a PC, a personal digital assistant (PDA), a mobile phone terminal, a portable image viewer, a printer apparatus having a display, a seal printing system, a digital photo frame, a music player, a game machine, an electronic book reader, and so on.

Also when a facial organ is selected from the LV image, embodiments are applicable not only to an imaging apparatus main body but also to an electronic apparatus (control apparatus) that communicates with an imaging apparatus (including a network camera) via wired or wireless communication to remotely control the imaging apparatus. Examples of electronic apparatuses that remotely control an imaging apparatus include a smart phone, a tablet PC, and a desktop PC. It is possible for a control apparatus to remotely control an imaging apparatus by transmitting commands for instructing the imaging apparatus to perform various operations and settings to the imaging apparatus based on operations and processing performed on the side of the control apparatus. In this case, the embodiment is applicable to processing on the control apparatus in a case where the control apparatus can receive, via wired or wireless communication, a live view image captured by the imaging apparatus and display the live view image, and a facial organ is selected from the live view image.

According to an exemplary embodiment, it is possible to allow a user to more correctly select a desired organ area.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-200572, filed Oct. 16, 2017, which is hereby incorporated by reference herein in its entirety.

What is claimed is:

1. An electronic apparatus, comprising:
a memory and at least one processor and/or at least one circuit which function as:
a detection unit configured to detect a specific subject area and an organ area included in the specific subject area from an image;
a touch detection unit configured to detect a touch operation on a display; and
a control unit configured to perform control, in response to a specific touch operation on an area corresponding to an unselected specific subject area detected from the image by the detection unit in the image displayed at a first magnification on the display, to select the specific subject area without selecting an organ area included in the specific subject area, a part including the specific subject area, of an area that is displayed when the image is displayed at the first magnification, being displayable at a second magnification, and after the image is displayed at the second magnification, in response to the specific touch operation on an area corresponding to an organ area included in the specific subject area in the image displayed on the display at the second magnification to select the organ area,
wherein, in the control performed by the control unit, whether the organ area included in the specific subject area is selectable in response to a touch on the image displayed on the display or not depends on whether the image is displayed on the display at the first magnification or at the second magnification, and
wherein the organ area remains selected even if a state returns from a state that the organ area is selected while the image is displayed on the display at the second magnification to a state that the image is displayed on the display at the first magnification.

2. The electronic apparatus according to claim 1, wherein the specific subject area is a person's face area.

3. The electronic apparatus according to claim 2, wherein the control unit selects, from within the image, any one of a plurality of organ areas including a right side eye and a left side eye included in a person's face through the specific touch operation.

4. The electronic apparatus according to claim 1, wherein the memory and at least one processor and/or at least one circuit further function as a display control unit configured to perform control, in response to the specific touch operation on the area corresponding to the selected specific subject area detected from the image by the detection unit in the image displayed at the first magnification on the display, to display a range including the selected specific subject area from the image, in an enlarged manner at the second magnification.

5. The electronic apparatus according to claim 4, wherein the display control unit performs control, when an organ area is selected in response to the specific touch operation while the image is displayed in an enlarged manner at the second magnification in response to the specific touch operation on the area corresponding to the selected specific subject area, to cancel the enlarged display at the second magnification and display the image at the first magnification.

6. The electronic apparatus according to claim 4, wherein the display control unit performs control, in response to the specific touch operation on the area corresponding to the selected specific subject area, to display the image in an enlarged manner at the second magnification and then automatically cancel the enlargement display at the second magnification and display the image at the first magnification.

7. The electronic apparatus according to claim 6, wherein the memory and at least one processor and/or at least one circuit further function as a reception unit configured to receive an enlargement operation, which is different from the specific touch operation, for instructing an image enlargement display,
wherein the display control unit displays the image in an enlarged manner at the second magnification in response to reception of the enlargement operation by the reception unit and does not automatically cancel the enlargement display at the second magnification.

8. The electronic apparatus according to claim 4, wherein the display control unit performs control, when a specific subject is selected, to display an index, on the image in an superimposed manner, indicating the selected specific subject area, and when an organ area is selected, to display an index, on the image in an superimposed manner, indicating the selected organ area.

9. The electronic apparatus according to claim 1, wherein the specific touch operation is detected when an initial touch on the display is detected or a release of a touch from the display is detected.

10. The electronic apparatus according to claim 1, wherein the image is a live view image captured by a camera.

11. The electronic apparatus according to claim 10, wherein the control unit performs control, based on a selected organ area, to perform at least one of automatic focusing processing, tracking processing, automatic exposure processing, and auto white balance processing.

12. The electronic apparatus according to claim 1, wherein the image is a recorded image and the control unit performs image processing thereon based on a selected organ area.

13. A method for controlling an electronic apparatus, comprising:
   detecting a specific subject area and an organ area included in the specific subject area from an image;
   detecting a touch operation on a display; and
   performing control, in response to a specific touch operation on the area corresponding to an unselected specific subject area detected from the image by the detecting in the image displayed at a first magnification on the display, to select the specific subject area without selecting an organ area included in the specific subject area, a part including the specific subject area, of an area that is displayed when the image is displayed at the first magnification, being displayable at a second magnification, and after the image is displayed at the second magnification, in response to the specific touch operation on the area corresponding to an organ area included in the specific subject area in the image displayed on the display at the second magnification to select the organ area,
   wherein, in the performing control, whether the organ area included in the specific subject area is selectable in response to a touch on the image displayed on the display or not depends on whether the image is displayed on the display at the first magnification or at the second magnification, and
   wherein the organ area remains selected even if a state returns from a state that the organ area is selected while the image is displayed on the display at the second magnification to a state that the image is displayed on the display at the first magnification.

14. A non-transitory computer-readable storage medium storing a program for causing a computer to function as each unit of the electronic apparatus according to claim 1.

15. The method according to claim 13, wherein the specific subject area is a person's face area.

16. The method according to claim 13, further comprising performing control, in response to the specific touch operation on the area corresponding to the selected specific subject area detected from the image by the detecting in the image displayed at the first magnification on the display, to display a range including the selected specific subject area from the image, in an enlarged manner at the second magnification.

17. The method according to claim 13, wherein the specific touch operation is detected when an initial touch on the display is detected or a release of a touch from the display is detected.

18. The non-transitory computer-readable storage medium according to claim 14, wherein the specific subject area is a person's face area.

19. The non-transitory computer-readable storage medium according to claim 14, the program for causing the computer to function as a display control unit configured to perform control, in response to the specific touch operation on the area corresponding to the selected specific subject area detected from the image by the detection unit in the image displayed at the first magnification on the display, to display a range including the selected specific subject area from the image, in an enlarged manner at the second magnification.

20. The non-transitory computer-readable storage medium according to claim 14, wherein the specific touch operation is detected when an initial touch on the display is detected or a release of a touch from the display is detected.

* * * * *